(12) United States Patent
Saunders

(10) Patent No.: US 7,778,874 B1
(45) Date of Patent: Aug. 17, 2010

(54) AUTOMATED GENERATION OF SUGGESTED ONLINE ADVERTISING CAMPAIGN PARAMETERS

(75) Inventor: Colin M. Saunders, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 1311 days.

(21) Appl. No.: 11/273,545

(22) Filed: Nov. 14, 2005

(51) Int. Cl.
*G06Q 30/00* (2006.01)
(52) U.S. Cl. .................................. 705/14.67; 705/14.66
(58) Field of Classification Search ............... 705/14.66, 705/14.67
See application file for complete search history.

(56) References Cited

U.S. PATENT DOCUMENTS

| 7,225,182 | B2 * | 5/2007 | Paine et al. ..................... 707/3 |
| 2001/0042064 | A1 | 11/2001 | Davis et al. |
| 2002/0026359 | A1 * | 2/2002 | Long et al. .................... 705/14 |
| 2005/0137939 | A1 | 6/2005 | Calabria et al. |
| 2005/0216335 | A1 | 9/2005 | Fikes et al. |
| 2005/0222901 | A1 * | 10/2005 | Agarwal et al. ............... 705/14 |
| 2005/0228797 | A1 * | 10/2005 | Koningstein et al. ........ 707/100 |

FOREIGN PATENT DOCUMENTS

WO   2005/065401 A2   7/2005

OTHER PUBLICATIONS

Sullivan, D., Article titled "Log Analysis: Seeing The Keywords Used To Find Your Web Site," dated Apr. 27, 2005 printed from www.searchenginewatch.com.

* cited by examiner

*Primary Examiner*—Jeffrey D Carlson
*Assistant Examiner*—Stacie D Gatling
(74) *Attorney, Agent, or Firm*—Knobbe, Martens, Olson & Bear LLP

(57) ABSTRACT

An advertising system automatically generates suggested ad campaign parameters for a business based on information obtained automatically from one or more sources, such as a corresponding business directory listing, a web site of the business, and/or a user account record associated with the business. The suggested ad campaign parameters, which may include suggested keyword strings for ad targeting, are presented to a user associated with the business via a partially or wholly pre-populated electronic form that can be submitted to create an active ad campaign for the business. In one embodiment, the pre-populated form is presented in response to the user selecting an ad solicitation object displayed on a web page. The ad solicitation object may be displayed in the format of an actual ad, and may include suggested ad text for use in the ad campaign.

26 Claims, 3 Drawing Sheets

AUTOMATED GENERATION OF SUGGESTED ONLINE ADVERTISING CAMPAIGN PARAMETERS

BACKGROUND OF THE INVENTION

1. Field of the Invention

The present invention relates to systems and methods for creating ad campaigns for online advertising.

2. Description of the Related Art

A number of online advertising systems exist for displaying targeted advertisements (also referred to as "sponsored links") on web pages. To advertise a business via such a system, a person associated with the business typically interacts with a series of web pages of the advertising system to set up one or more ad campaigns. During this process, the person typically specifies the text to be included in a particular ad, the URL of a target or "landing" page, ad targeting information for selecting the ad for display (e.g., one or more keywords or keyword phrases), and pricing information that governs how much the business/advertiser will be charged in connection with ad "click-thru" events (e.g., bid amounts associated with particular keywords). The business/advertiser can also typically specify one or more parameters, such as a daily budget and a campaign termination date, for controlling the timing and frequency with which a given ad is displayed. To encourage users to set up ad campaigns, some advertising systems present a "your ad here" link on web pages that display actual advertisements; this link, which may itself appear as an advertisement, can be selected to enter an ad-campaign-generation pipeline as described above.

Once an ad campaign has been created, the advertising system automatically selects the ad for display on the web pages of one or more web sites, and (typically) charges the advertiser for each resulting ad click-thru event. The particular method used by the advertising system to select ads for display may vary widely. For example, in the case of a search request from a user, the advertising system may present the ads of advertisers that have associated their respective ads with a search term or phrase entered by the user. In the case of a request for a relatively static web page, the advertising system may present those ads deemed to be the most closely related to page's textual content. The methods used to charge the advertisers for ad click-thru events can also vary widely.

Despite its effectiveness, many business owners with an online presence remain reluctant to use online advertising. For example, many business owners simply do not take the time to learn how to create an online advertising campaign. Other business owners are familiar with the ad campaign generation process, but are reluctant to spend the time needed to set up an advertising campaign. The present invention seeks to address these problems.

SUMMARY OF THE DISCLOSURE

The present invention comprises an advertising system, and associated methods, for enabling business owners and other users to rapidly and efficiently create online advertising campaigns. In one embodiment, while a user is accessing a web site, the user is identified as being associated with a business for which information, including a web address associated with the business, is available in an electronic data repository. For example, the user may be identified (e.g., via a cookie transmitted with a browser request) as being associated with a corresponding business listing in an online business directory, or as being associated with a "sellers" account for selling items via an online marketplace or auction system.

In response to the user being so identified, a web page requested by the user is supplemented with an ad solicitation object. This ad solicitation object may be presented together with, and in the same format as, one or more actual sponsored-link type ads, and may include information that is specific to the particular business. For instance, the ad solicitation object may include the heading "your ad here," and may include suggested ad text and/or a suggested target URL for the ad. The ad solicitation object may be presented on a search results page or on any other type of web page.

In one embodiment, if the user selects (e.g., clicks on) the ad solicitation object, the user is presented with a pre-populated ad campaign generation form for creating an advertising campaign. This form may be pre-populated with sufficient information for the user to create an active ad campaign for the business by merely selecting a "confirm" or "submit" button (or other selectable element). Thus, the user can create an ad campaign for the business with just two mouse clicks, without the need to enter any information into the ad campaign generation form. Alternatively, the user may choose to edit the pre-populated form prior to its submission. In other embodiments, the user may be required to enter additional information, and/or to perform one or more additional actions (such as viewing and consenting to an online agreement), in order to complete the ad-campaign generation process.

The ad campaign generation form may be pre-populated with information obtained from various sources. For example, the form may be pre-populated with a business name, business URL, and suggested ad text, obtained or derived from an associated business directory listing, user account record, and/or business web site. Further, in embodiments in which advertisers can associate their ads with particular keywords and keyword phrases (collectively "keyword strings"), the form may be pre-populated with one or more suggested keyword strings. The suggested keyword strings may, for example, be selected automatically by programmatically analyzing search histories of users to identify the keyword strings most frequently used to locate the business's web site, web page, and/or business directory. The ad campaign generation form may also be pre-populated with one or more of the following: (a) suggested bid amounts for particular keyword strings, as derived, for example, from historical bid activities of other advertisers/businesses that have used such keyword strings; (b) a default geographic region to target, as derived, for example, from a business address included in an associated business directory listing; (c) a suggested browse node or category to with which the ad is to be associated for purposes of selecting the ad for display, (d) a default budget for the ad campaign, (e) credit card information for paying for the ad campaign.

In other embodiments of the invention, the pre-populated ad campaign generation form may be presented to the user without first displaying an ad solicitation object on a web page. For example, in one embodiment, the pre-populated form, or a link to the pre-populated form, is transmitted to the user by email.

DETAILED DESCRIPTION OF SPECIFIC EMBODIMENTS

Specific embodiments of the invention will now be described with reference to the drawings. As will be recognized, the invention is not limited to these particular embodiments, but rather is defined by the claims. All of the U.S. patents, U.S. patent publications, and pending U.S. patent applications (collectively "patent references") referenced in the following description are hereby incorporated herein by reference; however, any definitions implicitly or explicitly set forth in these patent references should not be used to interpret the claims.

I. Overview (FIG. 1)

Figure 1:
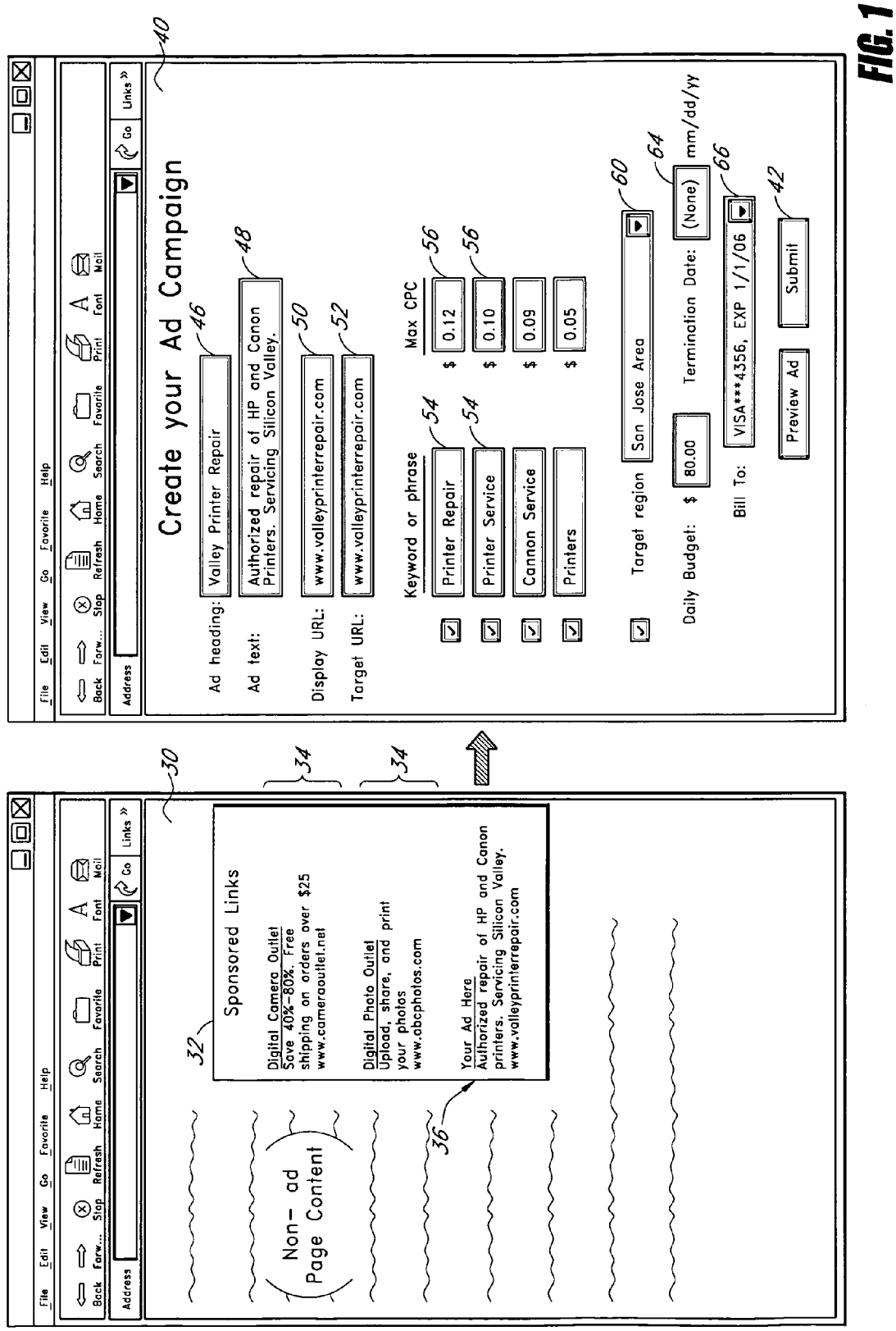
FIG. 1 illustrates a first web page which displays an ad solicitation object, and a second web page which is displayed when a user selects the ad solicitation object.

FIG. 1 illustrates an example sequence of web pages that may be presented to a user, via a web browser running on a user commuter, according to one embodiment of the invention. It is assumed in this example that the user is associated with a business (the "target business") that has a web site (the "target web site"), and that the user has set up an online account that includes information about the target business. As discussed below, the user may have supplied this business information for purposes of creating a business listing in an online business directory (also commonly referred to as an "online yellow pages"), for purposes of selling goods via an online auction system or online marketplace, or for any other reason. The user may, but need not, be the owner or manager of the target business.

The first web page 30 shown in FIG. 1 includes a "sponsored links" section 32 which displays two ads 34 served by an advertising system. Each ad 34 corresponds to a particular ad campaign of a particular business/advertiser, and is in the form of an object that can be selected (e.g., clicked on) by the user to generate a page request. As is conventional, if the user selects one of these ads, the advertising system typically redirects the user's web browser to a web site or web page of the associated business/advertiser, and charges the advertiser a fee. The ads 34 may be selected for display by the advertising system based on a search query entered by the user (particularly if the web page 30 is a search results page), based on the content of the web page 30, based on the geographic region of the user, and/or based on other criteria.

The sponsored links section 32 also includes a selectable ad solicitation object 36, or "pseudo ad," which is displayed in the same format as the actual ads 34. The ad solicitation object 36 in this example is customized with information about the target business, and particularly a suggested description and URL for creating an actual ad for the target business. As discussed below, the advertising system may automatically obtain this business information from an account record associated with the user. For example, if the user has created an online business directory listing that includes a business description field and a business URL field, the information included in these two fields may be used as the ad text and target URL, respectively. Although the ad solicitation object 36 contains information about the target business in this example, a generic (non-business-specific) ad solicitation object 36 may alternatively be used.

If the user clicks on the ad solicitation object 36, the user's web browser loads the second web page 40 shown in FIG. 1 from a web server of the advertising system. This second web page 40 is an ad campaign generation form, and is pre-populated with sufficient information for the user to immediately create/activate an ad campaign by merely clicking on the "submit" button 42. Thus, in the illustrated embodiment, the user can create an ad campaign for the target business with merely two mouse clicks or other selection actions—one on the ad solicitation object 36 and one on the submit button 42. Once the ad campaign has been generated, the advertising system begins displaying the newly created ad on web pages, including (in some embodiments) web pages of many different ad publishing sites, according to the parameters specified in the submitted form.

In other embodiments, the user may be required to perform one or more additional actions in order to complete the process of generating the ad campaign. For example, the user may be required to view and accept the terms of an agreement, or may be required to supply addition information.

In addition, in some embodiments, the user may be able to complete the process of creating the ad campaign from the first web page 30 shown in FIG. 1. For example, when the user clicks on or hovers the mouse cursor over the ad solicitation object 36, the pre-populated ad campaign generation form 40 may be displayed in an overlay display object or "popover" that is part of the same web page 30. If the user thereafter either clicks on the "submit" button 42 in this overlay display object, or moves the mouse pointer away from the overlay display object, the overlay display object disappears from the display. The overlay display objects may be generated using embedded JavaScript code as described in U.S. patent application Ser. No. 11/182,517, filed Jul. 15, 2005. As another example, the web page 30 could be configured such that the ad solicitation object 36, when clicked on or selected via a mouse-over operation, expands on the web page 30 to expose the ad campaign generation form 40.

The advertising system may serve ad solicitation objects 36 of the type shown in FIG. 1 for display on the web pages of many different ad publishing web sites that are part of an ad publishing network. Alternatively, the ad solicitation objects 36 may be displayed solely on a web site of the ad placement provider that operates the advertising system. Although displayed together with actual ads 34 is in the illustrated embodiment, the ad solicitation objects 36 may be displayed on web pages that do not include any actual ads.

II. Auto-Filling of Ad Campaign Generation Form

The types of information included in the pre-populated form 40 may vary depending upon the particulars of the advertising system, and depending upon the types of information available to the advertising system. In the example shown in FIG. 1, the "ad heading" field 46 is pre-populated with the name of the target business; the "ad text" field 48 is pre-populated with the same business description shown in the ad solicitation object 36; and the "display URL" and "target URL" fields 50, 52 are pre-populated with a URL of the target web site. Each of these fields 46-52 can be edited by the user to override the default/suggested text.

In one embodiment, all of the information included in these first four fields 46-52 is obtained automatically from an online business directory listing for the target business. To implement this feature, the "ad heading" field 46 and the "ad text" field 48 may be set to the same size (maximum number of characters) as the "business name" field and "business description" field, respectively, used in the online business directory. For instance, if the user interface for creating business directory listings includes an 85-character field for supplying a short business description, the "ad text" field may be set to eighty-five characters to provide field compatibility. The information included in some or all of these fields 46-52 may alternatively be obtained from other sources, such as (a) the target web site, (b) an account record created by the business for purposes of selling goods in an online auction or fixed-price marketplace system, and/or (c) information previously supplied by the user to create an ad campaign that is no longer active. In addition, the suggested ad text 48 may, in some cases, be supplied by an advertising system administrator who reviews the web sites, business listings, etc. of potential advertisers and enters suggested ad text into a database.

The example web form 40 shown in FIG. 1 also includes a set of suggested keyword strings (keywords and/or phrases) to be used by the advertising system to match the ad to search queries and/or web pages. Examples of methods that may be used to automatically identify particular keyword strings to recommend are provided below in the following subsection. Each keyword string is accompanied by a "max CPC" (cost per click) field 56 that is pre-filled with a suggested bid amount. The suggested bid amounts may be generated automatically by the advertising system based on historical data regarding bid submissions for these keyword strings, as is known in the art. If desired, the user can deselect a given keyword string (via the corresponding checkbox), modify or replace a suggested keyword string, and/or change the suggested bid amount for a given keyword string.

In addition or as an alternative to suggesting particular keyword strings, the pre-populated form 40 may suggest one or more nodes or categories of a hierarchical browse structure. For instance, in the example shown in FIG. 1, the advertising system may suggest that the ad be associated with the category/browse node "printer repair." If this association is created, users who access this node (which may be represented as a corresponding web page or set of web pages) while navigating the browse structure will be presented with the ad. Methods for associating ads with nodes of a browse structure, and for using these associations to select ads for display, are described in U.S. patent application Ser. No. 10/851,776, filed May 21, 2004.

With further reference to FIG. 1, the pre-populated web form 40 in the illustrated embodiment also includes a drop-down box 60 for specifying a target region. The drop-down box 60 in this example is set to the region "San Jose Area" based on the physical address of the target business, as specified in the corresponding business directory listing or elsewhere. If a target region is specified, the advertising system displays the newly created ad primarily to users falling in the specified region. If the business directory listing does not specify a physical address, the suggested target region may be omitted.

The pre-populated form 40 also includes a pre-filled "daily budget" field 62, a "termination date" field 64 that can be filled in if the user wishes to specify termination date for the campaign, and a credit card field 66 for specifying a credit card to be charged for pay-per-click transactions. The daily budget field 62 may be pre-filled with a default number used for all businesses, or with a number derived from the daily budget values used with the ad campaigns of similar web sites (see description below regarding automated methods of identifying similar web sites).

The advertising system may also present the user with data regarding the estimated performance of the suggested ad campaign. For example, the pre-populated form could include a section that displays an expected number of ad impressions (display events) per day, an estimated number of ad click-thru events per day, an estimated average cost-per-click, and/or an expected total cost per day. These and other types of campaign performance metrics can be calculated based on historical data collected in connection with ad campaigns of other businesses.

III. Automated Recommendations of Keyword Strings

The keyword strings that are suggested via the pre-populated form 40 may be derived automatically by the advertising system using any one or more of a variety of methods. For example, these strings may be generated by programmatically analyzing the content of the corresponding business directory listing for the target business, and/or the content of the target web site, to identify terms and phrases that tend to characterize or distinguish the target business relative to other businesses. Further, if an ad campaign has previously been set up for the target business (which may but need not be the case), some or all of the keyword strings previously used with the prior ad campaign may be suggested.

Yet another method that may be used to generate the suggested keyword strings involves identifying keyword strings that have been used in the ad campaigns of similar web sites. With this approach, an appropriate algorithm may initially be used to identify a set of "related web sites" that are similar to the target web site. A database of active and inactive ad campaigns is then accessed to determine whether ad campaigns have been created for any of these related web sites. The keyword strings used with any such ad campaigns—or those that were used the most frequently and/or effectively in such campaigns—are then selected to suggest. Examples of algorithms that may be used to identify the similar/related web sites, including algorithms that take into consideration the monitored web browsing activities of users, are described in U.S. application Ser. No. 09/345,611, filed Jun. 28, 1999 and U.S. Pat. Nos. 6,282,548 and 6,691,163.

Figure 2:
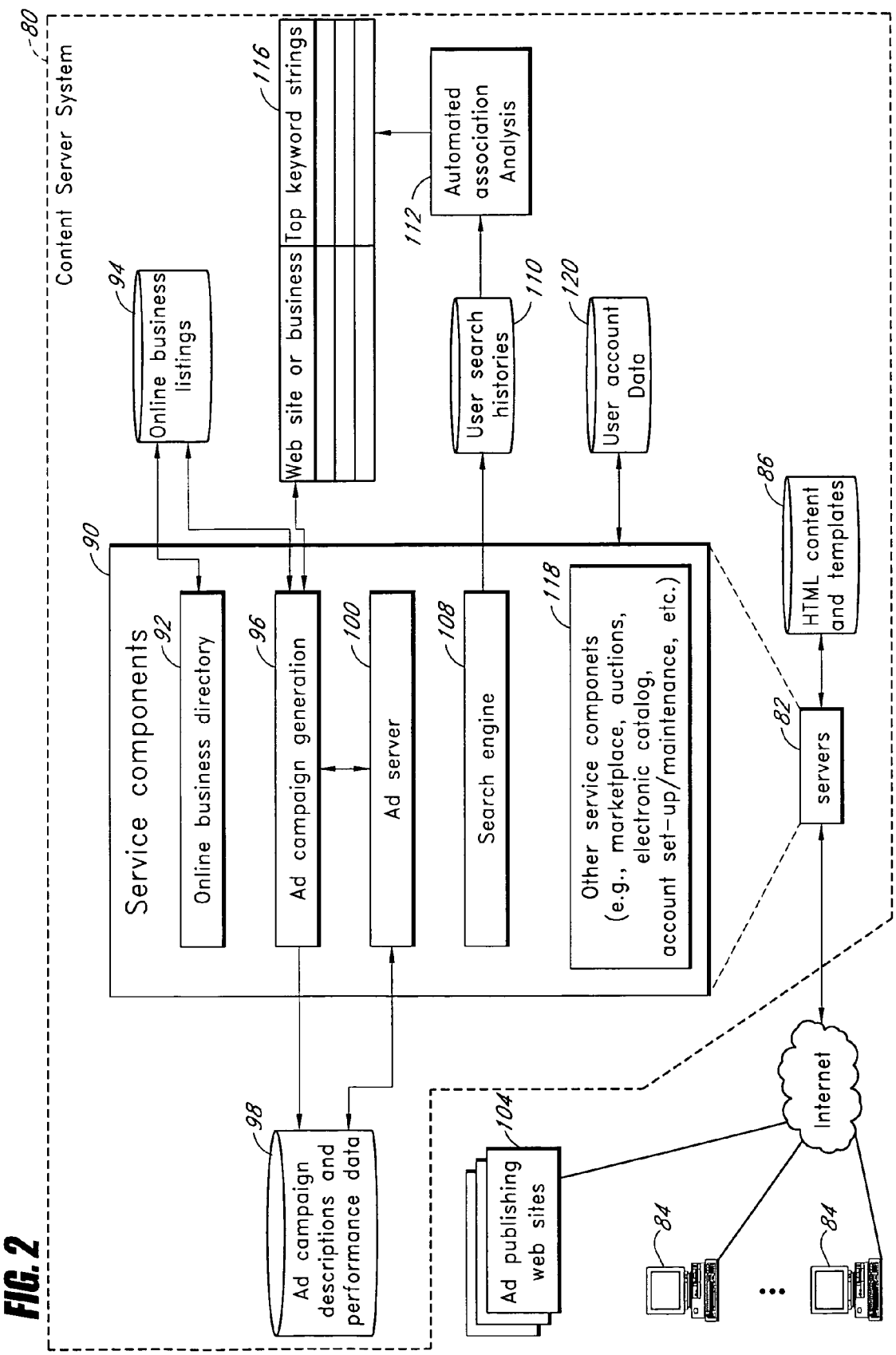
FIG. 2 illustrates the components of a system that provides functionality for automating the task of creating ad campaigns according to the process depicted in FIG. 1.

Another method that may be used to automatically identify keyword strings to suggest involves analyzing the search histories of users to identify the keyword strings most frequently used to locate the web site, web page, and/or business directory listing of the target business. In one embodiment of this method, a search engine system that provides functionality for searching the World Wide Web maintains search histories of individual users. Each such search history includes a record of the search strings entered by a particular user, and of the search result items (e.g., URLs representing particular web pages and web sites) selected by the user from corresponding search results pages. (As is known in the art, a search engine system can capture information about which external URLs were selected by using a redirect method to direct the user's web browser to a selected URL.) Periodically, these search histories are analyzed collectively to identify, for particular target web sites and businesses (e.g., those that have corresponding online business directory listings), the search strings that were used the most frequently to locate the web site, web page, and/or business directory listing of the respective business. Programmatic search-history-analysis methods similar to those described in U.S. Pat. No. 6,185,558 and U.S. Patent Pub. 2005/0222987 A1 may be used for this purpose. One embodiment of this method is depicted in FIG. 2 (discussed below) by elements 108, 110, 112 and 116.

The search strings used to locate web sites that are similar or related to a particular target site may also be taken into consideration in selecting keyword strings to suggest for the particular target site. For example, if target site A is determined to be similar to sites B, C and D, and the search phrase "HP printer repair" is frequently used to locate sites B, C and D, then this phrase may be suggested for use in site A's ad campaign even if the phrase has not been used frequently to locate site A.

Yet another search-history-based method that may be used to select keyword strings to suggest involves collectively analyzing the actions of users of a search result clipping service. Specifically, some search engines provide functionality for users to select particular web search result items to add to a clipping service account for later retrieval. When a user submits a particular search result item/web page to the clipping service, the web page (and/or its URL) is stored by the clipping service together with the user's search string. By collectively analyzing these clipping service submissions, search strings that are closely associated with a target business's web site can be identified for use as suggested keyword strings.

Keyword strings identified from other sources may additionally or alternatively be suggested. For example, with reference to FIG. 1, if the user conducted a search to locate the web page 10 on which the ad solicitation object 36 is displayed, the user's search string may be suggested as a keyword string (based on the assumption that the user's search is related to the business). As another example, the keyword strings associated with the ads 34 displayed on this web page 10 may be suggested.

Any combination of the foregoing methods, as well as other methods, may be used to select keyword strings to suggest. Where multiple methods are used, the user may be informed of the reasons why particular keyword strings are being suggested. For example, the ad campaign generation form 40 may include appropriate messaging such as "the following keyword strings are used relatively frequently as search strings to locate your web site . . . ," and "the following keyword strings are used by other advertisers with similar web sites . . . "

IV. System Components (FIG. 2)

FIG. 2 is a block diagram of one embodiment of a content server system 80 that implements an advertising system that provides automated ad campaign generation services as described above. The content server system 80 comprises one or more physical servers 82 that are accessed over the Internet by user computers 84 (PCs, PDAs, web-enabled cell phones, set-top boxes, etc.) that run web browser software. The servers 82 access a repository of HTML content and templates 86 that are used to dynamically generate web pages that are served to the user computers 84. The servers 82 may host the content and functionality of a single web site or multiple web sites.

As illustrated in FIG. 2, the servers 82 host a collection of service components 90 (executable code modules) that interact with the user computers 84 to provide various types of end-user functionality. One such service component is an online business directory component 92 that provides functionality for users to browse an online business directory or "yellow pages." This component 92 also provides functionality, including one or more web forms, for registered users to create and modify business directory listings for their respective businesses. The business listings that are created by users are stored in a corresponding data repository 94. Each such listing is typically stored in association with a user ID, or other credentials, of the registered user who created the listing. Although the embodiment shown in FIG. 2 includes an online business directory, the present invention may be implemented without the use of such a directory.

The service components 90 shown in FIG. 2 also include an ad campaign generation component 96 that provides functionality for users to create ad campaigns for their respective businesses—either manually or via the semi-automated process described above. The ad campaign generation component 96 accesses the repository online business listings 94 for purposes of obtaining business-specific information used to generate the ad solicitation objects 36 and pre-populated forms 40 shown in FIG. 1. As mentioned above, the business-specific information may additionally or alternatively be obtained from other sources.

Ad campaigns generated via the ad campaign generation component 96 are stored in a corresponding data repository 98. An ad server 100 selects ads from this "ad campaigns" repository 98 for display on web pages, typically in response to corresponding page requests (including search requests) from user computers 84. Ads selected for display by the ad server 100 may be incorporated into web pages generated and served by the servers 82 of the content server system 80, and/or may be incorporated into web pages of one or more external ad-publishing web sites 104. To cause a selected ad to be displayed on a web page of an external ad-publishing site, the content server system 80 may either deliver the ad to an external server of the ad publishing site 104 for incorporation into the web page, or may deliver the ad directly to a user computer 84 for display within the web page.

In the embodiment shown in FIG. 2, the content server system 80 also includes a search engine component 108 for users to conduct interactive searches of the World Wide Web and/or other types of data repositories. To implement the above-described method for identifying associations between particular keyword strings and web sites (see section III above), the search engine 108 records search query submissions, and corresponding search result selection events, in an electronic repository 110 (log file, relational database, etc.) to maintain user search histories. These search histories are analyzed periodically (e.g., daily, weekly or monthly) by an automated association analysis component 112, as described above, for purposes of building a table 116 that maps particular web sites to the search strings most commonly used to access these web sites. The ad campaign generation component 96 uses this table to look up particular keyword strings to suggest on the ad campaign generation form 40 in connection with particular businesses and ad campaigns. As mentioned above, various other methods may additionally or alternatively be used to identify keyword strings to suggest.

As depicted by block 118 of FIG. 1, the content server system 80 may also host various other types of services. For example, the system 80 may host a "marketplace" service of the type described in U.S. Patent Pub. 2003/0204449 A1, and/or an auction service, that provide(s) functionality for registered users to list items for sale, and to view and make purchases from listings created by other users. Where one or both of these types of services are provided, the ad campaign generator 96 may obtain some or all of the business information used to pre-populate ad campaign generation form 40 from the respective accounts of registered sellers. For example, when a user registers to sell goods via the system 80, the user may be prompted to supply a business name and business description; this information can subsequently be used to pre-fill the "ad heading" and "ad text" fields 46, 48, without reliance on a business directory listing.

Unless the marketplace or auction seller has an external web site that is known to the system 80, the "target URL" field 52 may be pre-filled with an internal URL that points to an "about me" page for the particular seller, or a page which lists all of the current sales listings of the particular seller. In addition, the keyword-string suggestions supplied on the pre-populated form 40, if any, may be derived by programmatically analyzing search histories to identify the search strings most commonly used to locate the sales listings of the particular seller.

As further depicted by block 118 in FIG. 2, the system 80 may also host an electronic catalog that lists particular items (physical products, movie titles, downloadable music titles, event tickets, etc.) that are available for purchase or rental from a business entity that operates system 80, of from a partner of such a business entity. The pages of this electronic catalog may be used to host actual ads 34, as well as ad solicitation objects 36, served by the ad server 100. If the electronic catalog includes a hierarchical browse structure of item categories, the ad campaign generator 96 may suggest particular browse nodes (item categories or items) of this browse structure for purposes of displaying the ad. For instance, in the example shown in FIG. 1, the pre-populated form 40 may suggest associating the ad with the browse node/category "printers," such that the ad will be displayed on web pages that fall within this category. The suggestions of particular browse nodes may be in addition to, or in lieu of, the suggestions of particular keyword strings.

Finally, the system 80 may host various types of account setup and maintenance pages that allow users to create accounts with the system, and to register with particular services. Account data supplied by individual users (typically including username and password, credit card information, shipping address, etc.) is stored in a data repository 120 that is accessible to some or all of the various services 90. As is conventional, once a user sets up an account with the system 80, the servers 82 write one or more cookie files to the user's computer 84, such that the user/user computer 84 may thereafter be identified as being associated with this account. The cookie or cookies written to a given user computer 84 may, in some embodiments, directly specify whether ad solicitation objects 36 are to be served to that computer 84. Other methods for identifying users may alternatively be used.

The various service components 90 depicted in FIG. 2, as well as the automated analysis component 112, may be embodied in code modules that are stored on computer storage devices (e.g., hard disk storage, solid state RAM memory, etc.) and executed by one or more general-purposes computers. The various electronic data repositories 86, 94, 98, 110, 120 shown in FIG. 2 may be implemented as relational databases, flat files, data structures, and/or other types data storage architectures.

Although the various services 90 depicted in FIG. 2 are shown as being part of a common system 80, one or more of these services may be external to the system 80. As one example, the online business directory 92 may be an external, independently-operated service that is accessed by the system 80 by making service calls over the Internet.

V. Process Flow for Serving Ad Solicitation Objects (FIG. 3)

Figure 3:
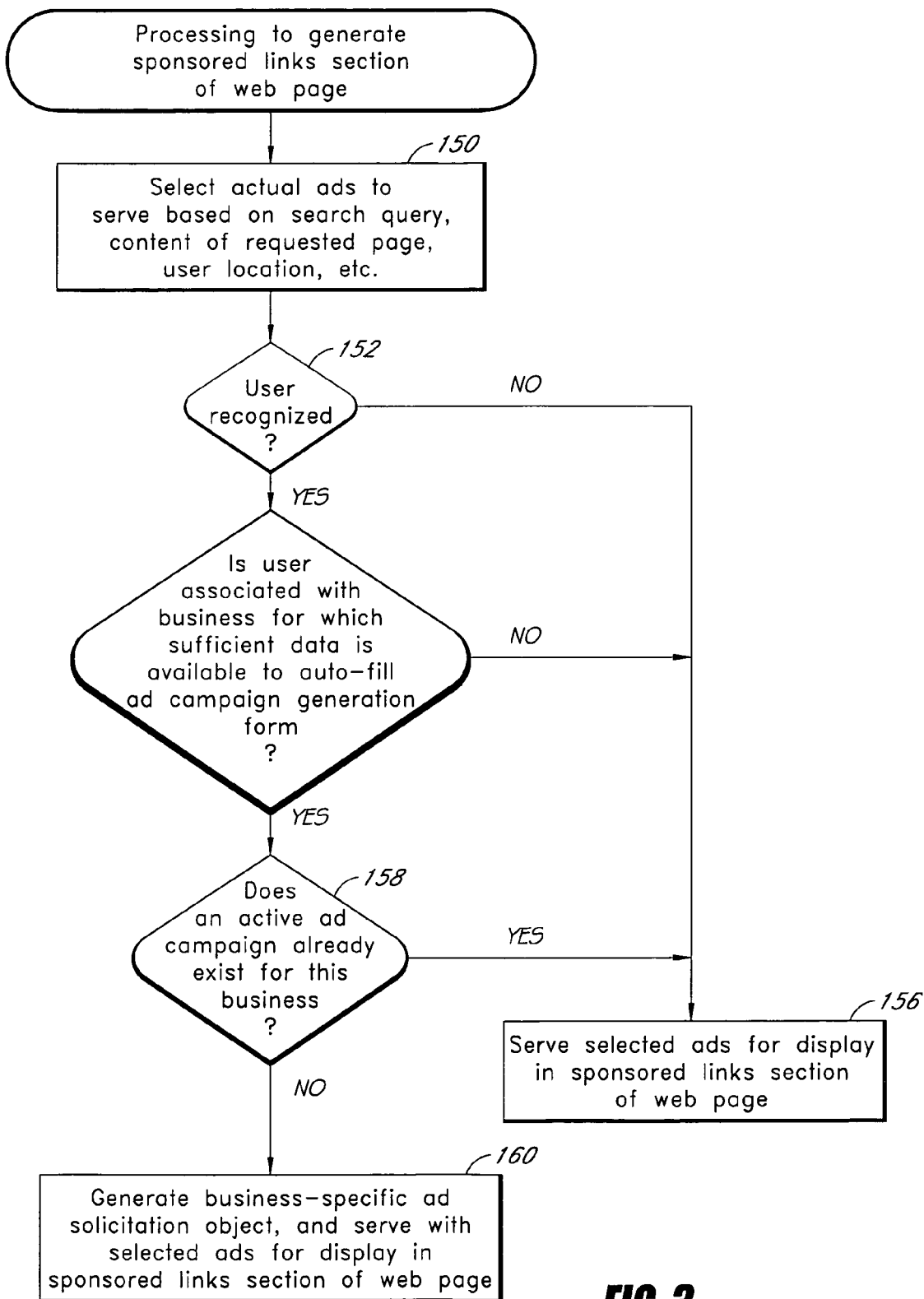
FIG. 3 illustrates a process that may be executed by the servers shown in FIG. 2 in order to serve ads and ad solicitation objects to users.

FIG. 3 illustrates one example of process that may be implemented by the ad server 100 of FIG. 2 to generate a "sponsored links" section 32 of a web page. This process may be executed when the servers 82 receive request (which may be in the form of a search query submission) from a user computer 84 for a web page that is configured to display sponsored links. The process shown in FIG. 3 may also be executed for purposes of generating the sponsored links section 82 of a web page served by an external ad publishing site 104; for example, an external ad publishing site 104 may deliver a web page that causes the recipient browser/user computer 84 to generate a request to the content server system 80 for ads to display on the web page.

In block 150 of FIG. 3, the ad server 100 attempts to identify one or more actual ads 34 that are suitable for display on the web page. As mentioned above, these ads 34 may be selected based on a search string supplied by the user (in the case of a search request), based on the content of the requested web page, and/or based on other criteria.

As depicted by blocks 152 and 154, if the user/user computer 84 is recognized by the system 80, the ad server 100 determines whether the user/user computer 84 is associated with a business for which sufficient data is available to auto-fill the ad campaign generation form 40. This step may involve accessing the user accounts data repository 120, the online business listings repository 94, and/or other sources of data associated with the user or the associated business. Alternatively, as mentioned above, a browser cookie previously set on the user's computer 84 may indicate whether the condition associated with block 154 is met. If this condition is not met, or if the user is not recognized, the ads 34 identified in block 150 (if any) are served for display on the web page, without an ad solicitation object (block 156).

If the condition specified in block 154 is met, the ad server 100 checks the ad campaigns repository 98 to determine whether an active ad campaign already exists for the target business, as depicted by block 158. If an active campaign exists, the actual ads 34 identified in block 150 (if any) are served without an accompanying ad solicitation object (block 156). Otherwise, a business-specific ad solicitation object, such as the object 36 shown in FIG. 1, is generated and served together with any actual ads 34 (block 160).

If the user thereafter clicks on this ad solicitation object, the system 80 populates the ad campaign generation form 40 and returns it to the user's computer 84. As mentioned above, the pre-populated form 40 may alternatively be sent to the user's computer with the ad solicitation object 36, but maintained in hidden on the page 30 unless/until the user clicks on or otherwise selects the ad campaign solicitation object.

Although not depicted in FIG. 3, the system 80 may implement an appropriate mechanism for limiting the frequency with which ad solicitation objects are presented to a given user. For example, they may be presented at a maximum rate of one impression per day per user.

VI. Email-Based Embodiments

In other embodiments of the invention, rather than presenting an ad solicitation object 36 on a web page, an email message may be sent to the user regarding the suggested ad campaign. This email message may include a hyperlink which points to the pre-populated ad campaign generation form 40. Alternatively, the pre-populated ad campaign generation form 40 may be included in the email message, such that the user can complete the process of creating/activating directly from the email message.

VII. Conclusion

All of the process steps and methods described herein, except those identified as being performed by a user, are preferably performed automatically (i.e., without human intervention) by computer, such as by execution of software.

As will be recognized, the invention may be embodied in a form that does not provide all of the features, benefits and implementation details set forth herein. For example, some of the features described herein may be omitted, or may be implemented differently than described. The scope of the invention is defined only by the claims.

What is claimed is:

1. A computer-implemented method, comprising:

providing an electronic marketplace that provides functionality for users to list items for sale and to view and make purchases from listings created by other users;

storing, in an electronic data repository associated with the electronic marketplace, seller's account information for a seller's account established with the electronic marketplace by a business, said seller's account information comprising information supplied by the business about said business, wherein the electronic marketplace is configured to enable the business to use the seller's account to sell items;

detecting that a user computer that has made a request for a web page is associated with said seller's account, said web page being part of a web site that is external to the electronic marketplace, said association between the user computer and the seller's account detected using a browser cookie received from said user computer;

automatically causing the web page to be supplemented with a selectable ad solicitation object, said ad solicitation object including, or being displayed in conjunction with, a display of an identifier of said business, said identifier determined based on the detected association between the user computer and the seller's account; and in response to user selection of the ad solicitation object, as displayed on the user computer as part of said web page, automatically causing the user computer to display an ad campaign generation form which is at least partially pre-populated with information for creating an online ad campaign for said business, said information comprising at least a portion of said seller's account information supplied by said business, said ad campaign generation form including an element which is selectable to submit the form to a server system to cause said ad campaign to be created;

wherein the method is performed automatically via execution of program instructions by one or more computing devices of said server system.

2. The method of claim 1, wherein the method comprises automatically pre-populating the ad campaign generation form with information sufficient to immediately create the online ad campaign for the business, such that a user of said user computer can set up said online ad campaign without entering any information into the ad campaign generation form.

3. The method of claim 1, wherein the method comprises pre-populating at least a portion of said form with information previously supplied by said business for purposes of selling items in said electronic marketplace.

4. The method of claim 1, wherein the step of causing the web page to be supplemented with a selectable ad solicitation object is performed at least partly in response to a programmatic determination that the business does not have an active online advertising campaign with the server system.

5. The method of claim 1, further comprising pre-populating the ad campaign generation form with at least one suggested keyword string to be used to select an ad for the business for display on web pages.

6. The method of claim 5, further comprising programmatically selecting said keyword string based, at least in part, on how frequently the keyword string has been used to locate a web site of the business, as reflected in search histories of users.

7. The method of claim 1, wherein the electronic marketplace provides functionality for users to buy and sell items using an auction model.

8. The method of claim 5, further comprising programmatically selecting said keyword string based, at least in part, on keyword stings used in ad campaigns of other businesses.

9. The method of claim 5, further comprising pre-populating the ad campaign generation form with a suggested bid amount for the suggested keyword string, said suggested bid amount generated automatically using historical data associated with other ad campaigns.

10. The method of claim 1, wherein the method comprises automatically pre-populating the ad campaign generation form with an identifier of a suggested browse node to be used to automatically select an ad for the business for display on web pages.

11. The method of claim 1, wherein the method comprises automatically pre-populating the ad campaign generation form with at least the following default information for creating the ad campaign: (a) a textual description to be included in an ad for said business, (b) a web site address of a landing page, (c) an ad targeting criterion to be used for selecting the ad for display, and (d) pricing information.

12. The method of claim 11, wherein the ad targeting criterion comprises a geographic region derived from an online business directory listing for the business.

13. The method of claim 1, wherein the ad solicitation object includes suggested ad text of an ad for said business.

14. The method of claim 1, further comprising responding to user selection of said element by automatically activating said ad campaign.

15. The method of claim 1, wherein causing the user computer to display an ad campaign generation form comprises transmitting the at least partially pre-populated form to the user computer in response to said user selection of the ad solicitation object.

16. The method of claim 1, wherein causing the user computer to display an ad campaign generation form comprises supplementing said web page with the ad campaign generation form.

17. A computer system, comprising:

a server system that includes one or more physical servers, said server system configured to provide an electronic marketplace that provides functionality for users to list items for sale and to view and make purchases from listings created by other users, said server system operative to perform a method that comprises:

storing, in an electronic data repository associated with the electronic marketplace, seller's account information for a seller's account established with the electronic marketplace by a business, said seller's account information comprising information supplied by the business about said business, wherein the server system is configured to enable the business to use the seller's account to sell items in the electronic marketplace;

detecting that a user computer that has made a request for a web page is associated with said seller's account, said web page being part of a web site that is external to the server system, said association between the user computer and the seller's account detected using a browser cookie received from said user computer;

automatically causing the web page to be supplemented with a selectable ad solicitation object, said ad solicitation object including, or being displayed in conjunction with, a display of an identifier of said business, said identifier determined based on the detected association between the user computer and the seller's account; and in response to user selection of the ad solicitation object, as displayed on the user computer as part of said web page, automatically causing the user computer to display an ad campaign generation form which is at least partially pre-populated with information for creating an online ad campaign for said business, said information comprising at least a portion of said seller's account information supplied by said business, said ad campaign generation form including an element which is selectable to submit the form to a server system to cause said ad campaign to be created.

18. A computer-implemented method, comprising:

providing an electronic marketplace that provides functionality for users to list items for sale and to view and make purchases from listings created by other users;

storing, in an electronic data repository associated with the electronic marketplace, seller's account information for a seller's account established with the electronic marketplace by a business, said seller's account information comprising information supplied by the business about said business, wherein the electronic marketplace is configured to enable the business to use the seller's account to sell items;

detecting an association between a user computer and the seller's account;

at least partly in response to detecting said association, causing a selectable ad solicitation object to be displayed on a web page requested by said user computer such that the ad solicitation object is displayed on the web page as a pseudo advertisement for said business together with one or more actual advertisements, and such that the ad solicitation object displays a web site address of said business, said web page being part of a web site that is external to the electronic marketplace; and in response to user selection of the ad solicitation object, outputting for display on said user computer a pre-populated ad campaign generation form that is at least partially pre-populated with information for generating an online ad campaign for said business, said pre-populated ad campaign generation form including an element which is selectable to submit ad campaign information to a server;

wherein the method comprises automatically pre-populating the ad campaign generation form with at least a portion of said seller's account information supplied by said business;

wherein the method, including detecting said association, causing the ad solicitation object to be displayed, outputting the pre-populated ad campaign generation form, and pre-populating said ad campaign generation form, is performed automatically by a server system that comprises one or more physical servers.

19. The method of claim 18, wherein the web site is an external ad publishing site.

20. The method of claim 18, wherein the electronic marketplace provides functionality for users to buy and sell items online using an auction model.

21. The method of claim 18, wherein the method additionally comprises automatically pre-populating the ad campaign generation form with information automatically obtained from a web site of said business.

22. The method of claim 18, wherein the method comprises automatically pre-populating at least a portion of the ad campaign generation form with a business description previously supplied by the business in setting up said seller's account.

23. The method of claim 18, wherein the ad solicitation object includes suggested ad text for the ad campaign, said suggested ad text corresponding to said business.

24. The method of claim 18, wherein the pre-populated form is pre-populated with sufficient information to immediately create the ad campaign.

25. The method of claim 18, further comprising responding to user selection of said element by automatically creating the ad campaign without requiring any subsequent user action.

26. The method of claim 18, wherein the method comprises detecting said association between the user computer and the seller's account based on a browser cookie received from the user computer.

* * * * *